United States Patent
Hildebrand et al.

(10) Patent No.: US 8,525,076 B2
(45) Date of Patent: Sep. 3, 2013

(54) METHOD AND DEVICE FOR MACHINING A WORKPIECE

(75) Inventors: Peter Hildebrand, Pfronten (DE); Michael Kuhl, Füssen (DE)

(73) Assignee: Sauer GmbH Lasertec, Kempten (DE)

( * ) Notice: Subject to any disclaimer, the term of this patent is extended or adjusted under 35 U.S.C. 154(b) by 697 days.

(21) Appl. No.: 12/531,587

(22) PCT Filed: Mar. 17, 2008

(86) PCT No.: PCT/EP2008/002105
§ 371 (c)(1), (2), (4) Date: Jan. 22, 2010

(87) PCT Pub. No.: WO2008/113535
PCT Pub. Date: Sep. 25, 2008

(65) Prior Publication Data
US 2010/0147815 A1 Jun. 17, 2010

(30) Foreign Application Priority Data
Mar. 16, 2007 (DE) .......................... 10 2007 012 816

(51) Int. Cl.
*B23K 26/04* (2006.01)
*B23K 26/073* (2006.01)

(52) U.S. Cl.
USPC ............ 219/121.74; 219/121.83; 219/121.67; 219/121.72; 219/121.78

(58) Field of Classification Search
USPC ......................................... 219/121.62, 121.7
See application file for complete search history.

(56) References Cited

U.S. PATENT DOCUMENTS

| | | | | |
|---|---|---|---|---|
| 4,749,840 A | * | 6/1988 | Piwczyk | 219/121.68 |
| 4,801,352 A | * | 1/1989 | Piwczyk | 156/345.5 |

(Continued)

FOREIGN PATENT DOCUMENTS

| | | |
|---|---|---|
| DE | 4209933 A1 | 9/1993 |
| DE | 10032981 A1 | 1/2002 |

(Continued)

OTHER PUBLICATIONS

Notification of Transmittal of Translation of the International Preliminary Report on Patentability (Form PCT/IB/338) of International Application No. PCT/EP2008/002105 mailed Oct. 22, 2009 with Forms PCT/IB/373, PCT/IB/326 and PCT/ISA/237.

(Continued)

*Primary Examiner* — Zandra Smith
*Assistant Examiner* — Tsz Chiu
(74) *Attorney, Agent, or Firm* — Westerman, Hattori, Daniels & Adrian, LLP

(57) ABSTRACT

The invention relates to a method for machining a workpiece by means of a laser beam, wherein a laser beam is guided by a beam guiding device over the surface of the workpiece within a working window. The beam guiding device and the workpiece are arranged in such a way that they are movable relative to one another in a direction of displacement along a displacement section and that they can occupy a first and a second relative working position to one another. According to the invention, a point on the workpiece can be machined from the second relative working position, said point being located behind the point which is machined from the first relative working position when viewed in the direction of displacement.

16 Claims, 8 Drawing Sheets

(56) References Cited

U.S. PATENT DOCUMENTS

| | | | |
|---|---|---|---|
| 4,904,340 A * | 2/1990 | Miracky et al. | 216/87 |
| 5,101,091 A * | 3/1992 | Grub et al. | 219/121.74 |
| 5,149,937 A * | 9/1992 | Babel et al. | 219/121.68 |
| 5,225,650 A * | 7/1993 | Babel et al. | 219/121.69 |
| 5,262,613 A * | 11/1993 | Norris et al. | 219/121.68 |
| 5,368,900 A * | 11/1994 | Jelley et al. | 427/555 |
| 5,546,187 A * | 8/1996 | Pepper et al. | 356/487 |
| 6,156,220 A | 12/2000 | Ohlig | |
| 6,193,899 B1 | 2/2001 | Ohlig | |
| 6,518,544 B2 | 2/2003 | Aberle et al. | |
| 6,670,575 B1 | 12/2003 | Wrba et al. | |

FOREIGN PATENT DOCUMENTS

| | | |
|---|---|---|
| DE | 10317822 A1 | 12/2004 |
| EP | 1174208 A2 | 1/2002 |
| JP | 2006-326618 A | 12/2006 |
| JP | 2006-346738 A | 12/2006 |
| JP | 2007-44729 A | 2/2007 |
| WO | 00/18535 A1 | 4/2000 |

OTHER PUBLICATIONS

International Search Report for PCT/EP2008/002105, mailing date of Jul. 29, 2008 and PCT/ISA/237 Written Opinion.

* cited by examiner

METHOD AND DEVICE FOR MACHINING A WORKPIECE

The invention relates to a method and a device for machining a workpiece by means of a laser beam according to the preambles of the independent claims. Such are known from WO 00/18535.

Figure 1A:
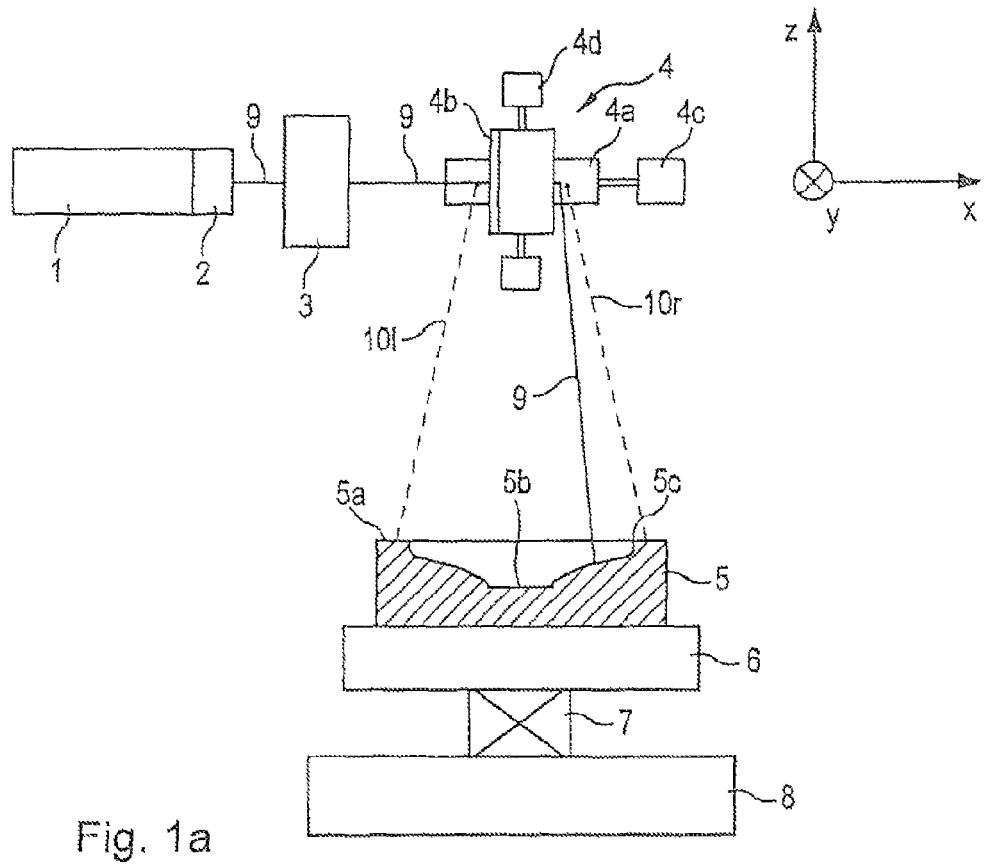

FIG. 1a shows a general structure of a machine for laser machining. 1 denotes a laser source, 2 denotes an on/off switch for the laser light, 3 denotes an optical system for focusing the laser beam onto the surface of the workpiece, 4 denotes a beam guiding device in order to be able to guide the laser beam onto and over the workpiece, respectively, 5 denotes the workpiece, 6 denotes a workpiece table, 7 denotes an adjusting device for the workpiece table along at least two directions of space and 8 denotes the machine frame in the sense of a fixed point. A rectangular coordinate system is also schematically shown. The x- and y-axes can be horizontal axes, the z-axis can be a vertical axis.

The laser source 1 emits a laser beam 9, preferably pulsed, which is guided by the beam guiding device 4 over the surface of the workpiece as desired. During this process, the machining of the workpiece can either be the forming of a cavity in which the laser beam is comprehensively guided across the surface to be ablated by completely skimming it in the course of time, for example, in a meandering way, whereby a layer of a predetermined thickness and an exactly defined boundary is removed and whereby this laminar removal is repeatedly carried out depthwise. However, it may also be the surface machining which is addressed in a manner that no volume removal is desired but rather the machining of the existing surface in order to impart to it special optical or mechanical properties.

The beam guiding device 4 can include intersecting movable mirrors 4a, 4b driven by respective drive units 4c and 4d. They each have a particular deflection area which correspondingly allows the laser beam to be guided in a particular area of the workpiece surface. In FIG. 1a, the boundaries of the area are outlined in dashed lines on the left and right by reference numerals 10l and 10r.

Figure 1B:
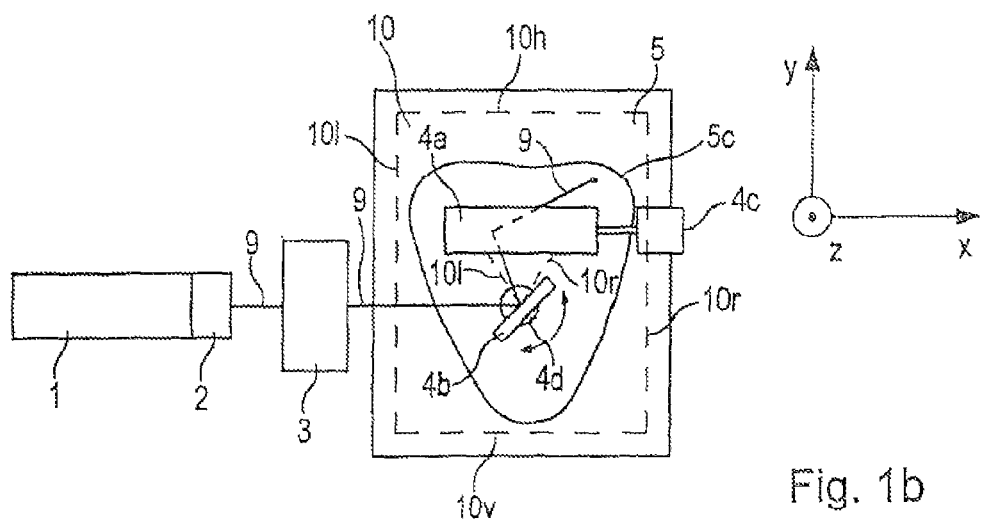

FIG. 1b shows a plan view of the proportions. The same reference numerals denote the same components. In the embodiment as shown, the two movable mirrors are spaced apart in the horizontal direction and vertically positioned above the workpiece. The movable mirror 4b reversibly rotates about the z-axis, the movable mirror 4a reversibly rotates about the x-axis. According to the respective momentary position of the mirrors, the laser beam impinges on a particular spot below on the workpiece 5. There, 5c marks the edge of the cavity, that is, ultimately the maximally required deflection of the laser beam in order to be able to manufacture the cavity in the desired manner.

The projections of the deflection boundaries 10l and 10r are drawn in dashed lines on the surface of the workpiece 5. In the same manner as on the left and right, these boundaries also exist in the front and rear (as seen in FIG. 1a) so that accordingly boundaries 10v and 10h exist in deflectability as well. Thus, all in all, a working window can be defined on the surface of the workpiece within which the workpiece can be machined at a predetermined relative positioning of the beam guiding device and the workpiece to one another. The working window 10, which of course only exists as a logical magnitude and cannot be recognizes physically, can be described by the limits 10l, 10r, 10v and 10h. These boundaries can be defined by the deflectability of the movable mirrors. However, they can also be defined by other given factors, for example, by screens or control-oriented limits. It is pointed out that the movable mirrors alone would generate a working window waisted along one dimension because the starting points of the horizontal beam swings are differently positioned according to the differently positioned mirrors. A rectangular, preferably square, working window can be selected therefrom in such a manner, for example, that the smallest dimension of the waist is chosen as the window size.

Figure 1C:
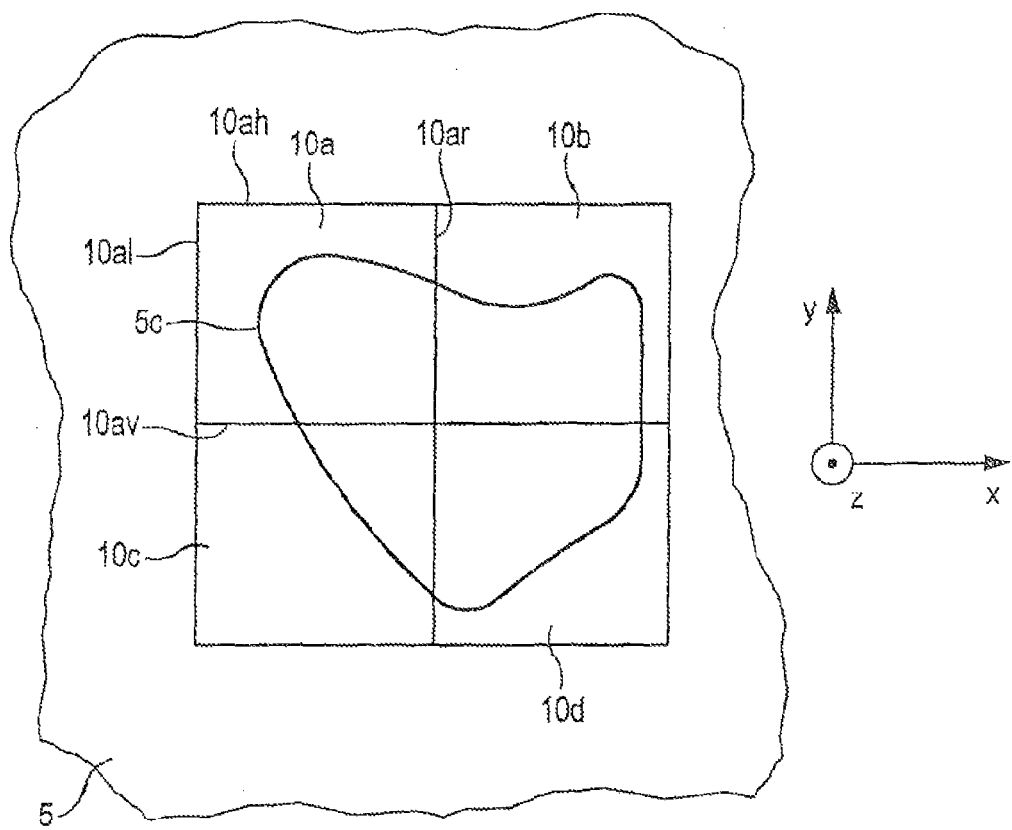

FIG. 1c shows a situation in which a cavity is so large that it cannot be machined within one single working window. Line 5c marks the outer boundary of the cavity 5. Here, the cavity 5 is so large that it cannot be machined within one single working window 10, as shown in FIG. 1b. Thus, the workpiece 5 and the guiding device 4 must be displaced relative to one another to be able to machine such areas of the workpiece which cannot be machined from a first relative position from a second relative position. The procedure is schematically shown in FIG. 1c. Here, individual working windows 10a, 10b, 10c and 10d are shown which are adjusted in sequence by the relative positioning of the workpiece (table) and the beam guiding device to one another. Then, the desired machining operations are performed with such a relative positioning. After that, the relative positioning is displaced to another window and then the machining will be performed there by means of the laser beam guiding device. In this manner, it is possible to move to a plurality of relative positions within which the machining operations will respectively be performed. The limits 10ah, 10ar, 10av and 10al are outlined for the window 10a.

Figure 1D:
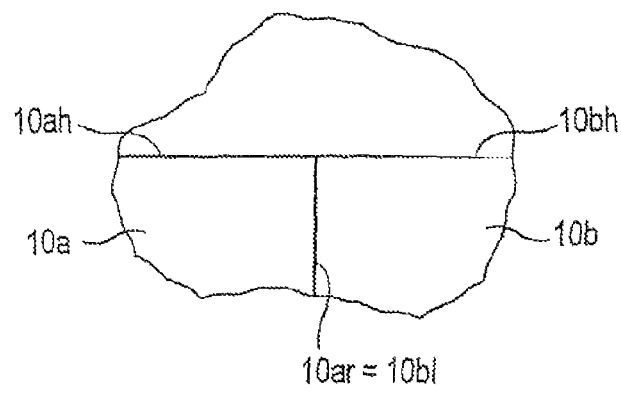

FIG. 1d shows a magnified section. Usually, the working windows are placed next to one another in such a way that they directly adjoin one another. This results in the fact that, for example, the right-hand side limit 10ar of the window 10a is also the left-hand side limit 10bl of the window 10b. WO 00/18535 describes such a method. Other relevant prior arts are DE 100 32 981 and DE 42 09 933.

Figure 1E:
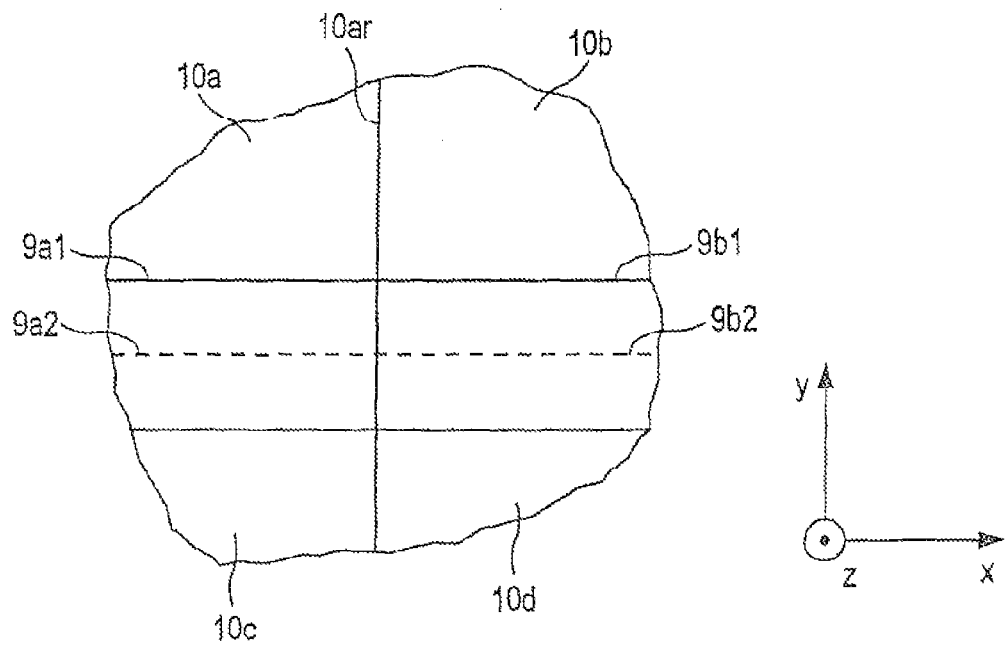
Figure 1F:
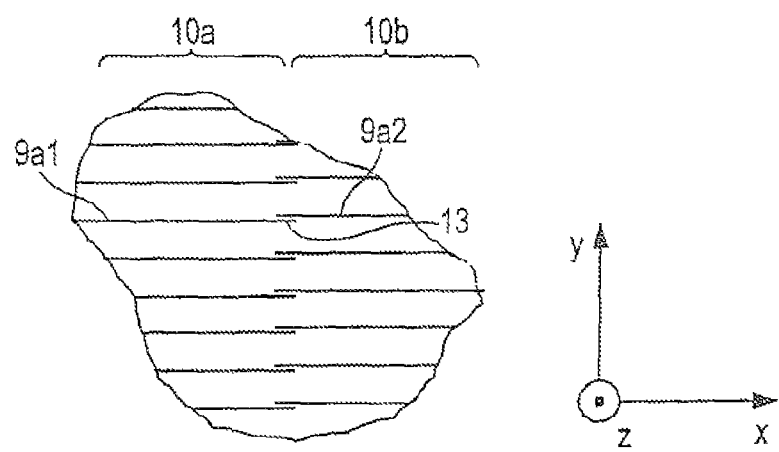

Next, FIG. 1e schematically shows the machining process. Again, a section (magnified) from the surface of the workpiece is illustrated. Four adjoining working windows 10a, 10b, 10c and 10d are shown. For example, from the relative position leading to the working window 10a, a track 9a1 is drawn for the continuous removal of material up to the right-hand side window limit 10ar which then can be continued as a track 9b1 leading from a new relative position to a new working window 10b. The same applies if, for example, not a continuous removal is to be accomplished but if the surface is only to be machined point-by-point or at some spots by means of the laser beam. Even then it is possible to adjust an intermitting machining 9a2 from the one relative position corresponding to window 10a, which can then be continued with the intermitting machining 9b2 from the other relative position leading to window 10b. In this manner it is possible to machine cavities and surface areas, respectively, which are larger than the working window of the laser beam guiding device 4.

However, it is a disadvantage of the method that the transitions may be visible on the completely machined surface. The reason therefor is that the adjustment accuracies for the relative positions of workpiece and beam guiding device have inaccuracies in relation to one another which may lead to the fact that the end point of the track from the one relative working position corresponding to the one window (for example 10a) does not exactly abut the starting point of the track from the other relative position (corresponding to the other working window, for example 10b). Here, overlaps or gaps or displacements may occur. Another reason for such "continuity flaws" are effects when the laser beam is switched on and off, which may also lead to the fact that the end and starting areas of the respective tracks do not adjoin one another, as ideally preferred, but are manufactured with clearly visible discontinuities. Edge effects of the mirrors or in the mirror guiding devices may also lead to inaccuracies.

In this connection it is to be pointed out that a single discontinuity would not stand out. If one assumes, for example, an adjustment accuracy in the x-y direction of e.g. 10 μm, a single error of this magnitude would certainly not be noticed. However, as the error is repeated due to the system and occurs in a strictly correlated manner at the boundaries of the working windows, it will, among others, also be perceivable optically as a line running along a boundary of a working window and insofar optionally present a problem also as to the manufacture. Incidentally, this does not only apply if a cavity is to be formed depthwise and laminar material removal is desired but also if merely a surface is to be machined, even if only a point-by-point machining corresponding to the guidance $9a2$ and $9b2$ is performed there. Overlaps or gaps or displacements along the working window boundaries would then have a clearly visible effect, too.

It is the object of the invention to provide a method and a device for machining a workpiece by means of laser beams which allow a more uniform and in particular non-visible machining of a workpiece from various relative positions of workpiece and laser beam guiding device to one another.

This object is achieved by means of the features of the independent claims. Dependent claims relate to preferred embodiments of the invention.

In a method for machining a workpiece by means of a laser beam a laser beam is guided by using a beam guiding device over the surface of the workpiece within a working window, the beam guiding device and the workpiece being arranged in such a way that they are movable relative to one another in a direction of displacement for a displacement distance and that they can occupy a first and a second relative working position to one another. From the second relative working position a spot on the workpiece is machined which is located behind a spot machined from the first relative working position when viewed in the direction of displacement.

In a method for machining a workpiece by means of a laser beam guided by a beam guiding device, the workpiece and beam guiding device may be displaced relative to one another by a displacement distance, the displacement distance being smaller than the extension of the working window in the direction of displacement.

The working windows, which are to be adjusted in sequence by different relative positionings of the workpiece and beam guiding device to one another, overlap. In the overlapping area, spots of the workpiece can optionally be machined from one window (from the one relative position) or from the other window (from the other relative position) adjusted later. This can be used to spatially distribute the error so that it is less visible or not visible at all.

Within the overlapping area it is possible to run various strategies: Within one track it is possible to interlace working spots from the one relative position with those from the other relative position. Preferably, the former ones are stored as manufactured in a memory so that the latter ones may be interposed. However, it is also possible to let tracks, which are more or less continuous and more or less parallel to one another, end at different positions in the guiding direction (direction of the track) within the transition area, in order to continue them then at the respective position from the other relative position. These end points differing in the direction of the track may be adjusted statistically or follow a quasi-random pattern or a regular pattern. The end points of the respective tracks, which are determined as above (statistically, quasi-statistically) and then manufactured, are stored so that they can later be taken from another suitable working window and then be continued.

The adjustment and change of the working windows take place by moving the workpiece 5 relatively to the beam guiding device 4. For this purpose, the workpiece table 6 may, for example, be movable by means of the adjusting means 7 along at least two spatial directions, preferably in the plane of the surface of the workpiece, relative to the machine frame 8. In addition thereto or instead thereof, the beam guiding device 4 may also be movable relative to the machine frame, optionally together with the laser 1, the switch 2 and the optical system 3.

The positioning error as such, which results relatively as compared of the different relative positionings according to the different working windows, is not corrected by the method according to the invention but accepted. However, it is "geographically" distributed on the surface so that it appears in a less correlated manner and thus is less disturbing and less visible, respectively.

A device for performing the described method is also a subject-matter of the invention. Apart from the above-mentioned components, it comprises a controller and a memory, the controller deciding the usual control tasks (in particular beam guidance, blanking in/out of the laser, relative positioning of the workpiece and beam guiding device) and, in addition thereto, the overlapping setting of the working windows and inside each of them the determination of the working limits or spots. These provisions can be stored in the memory so that they can be accessed later.

Figure 2:
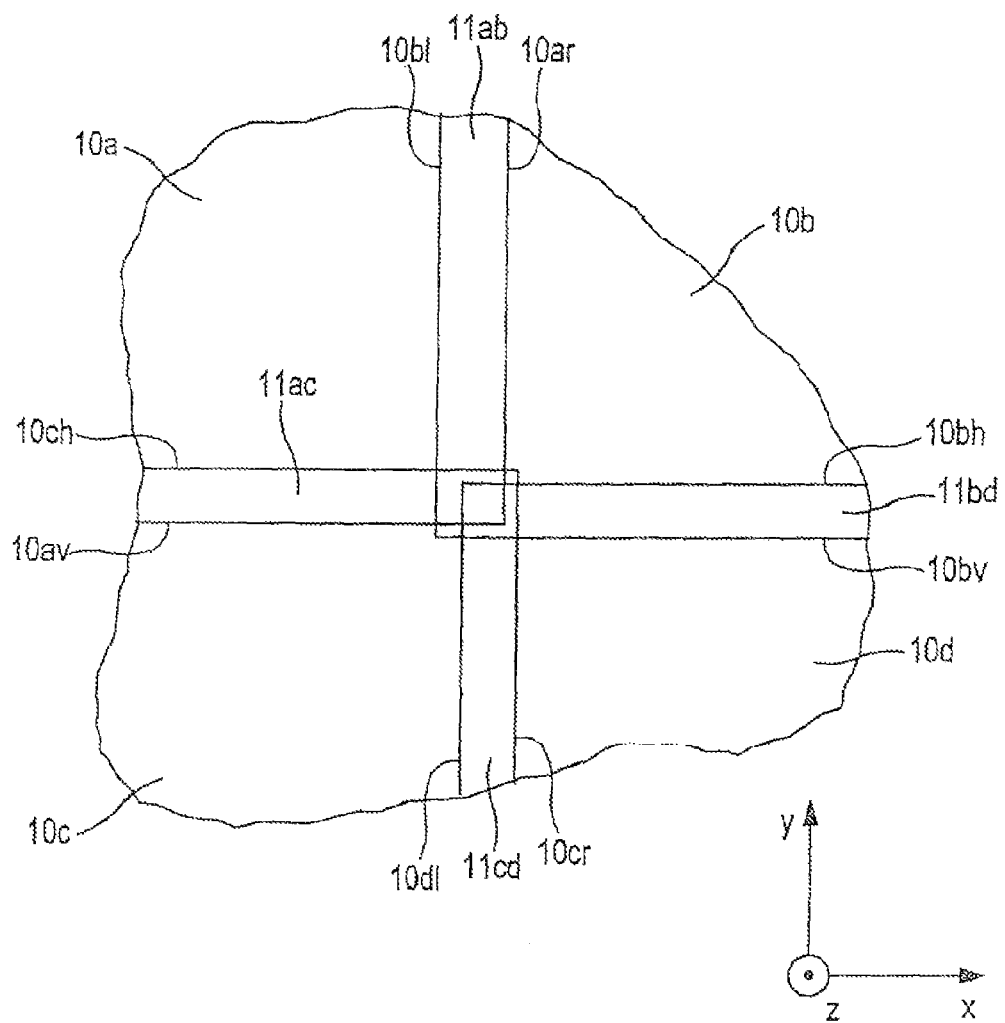
Figure 4A:
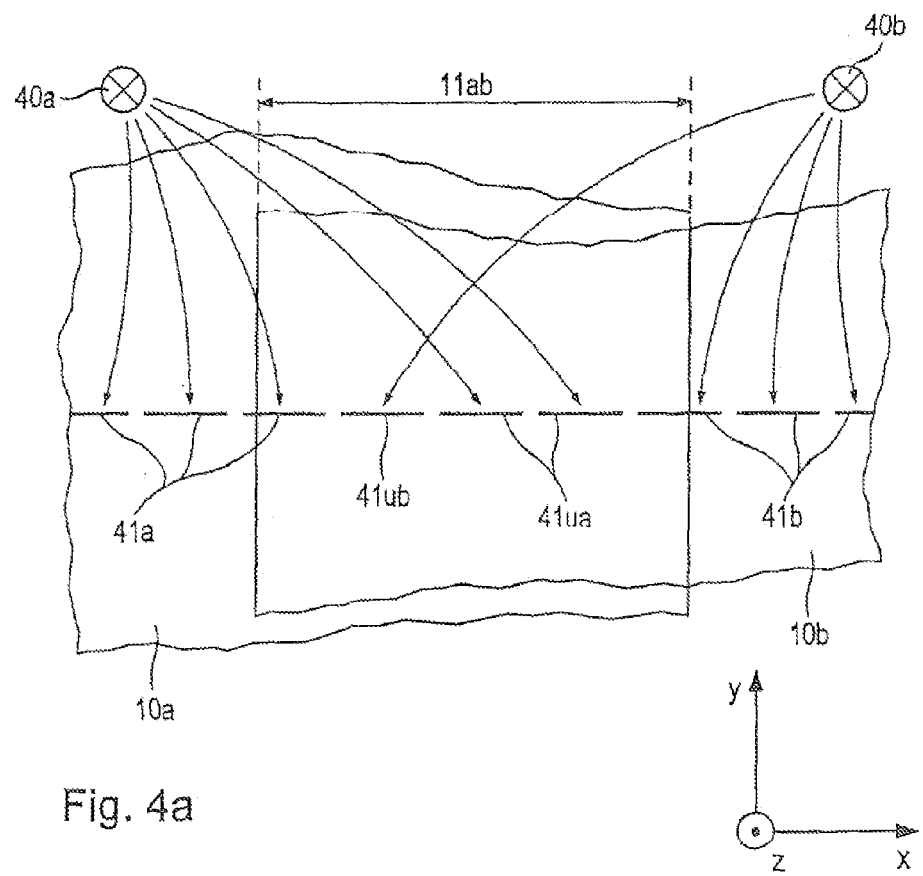
Figure 4B:
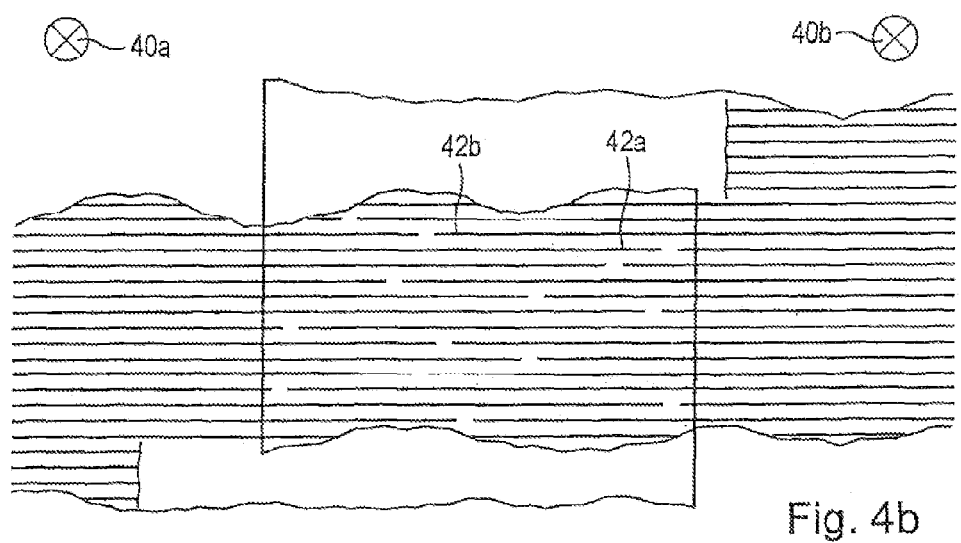
Figure 5:
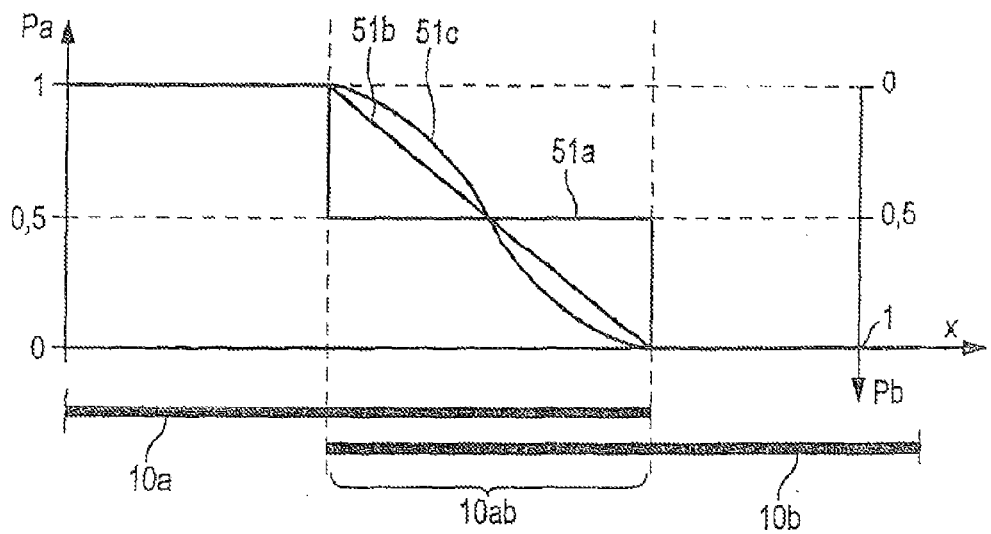
Figure 6:
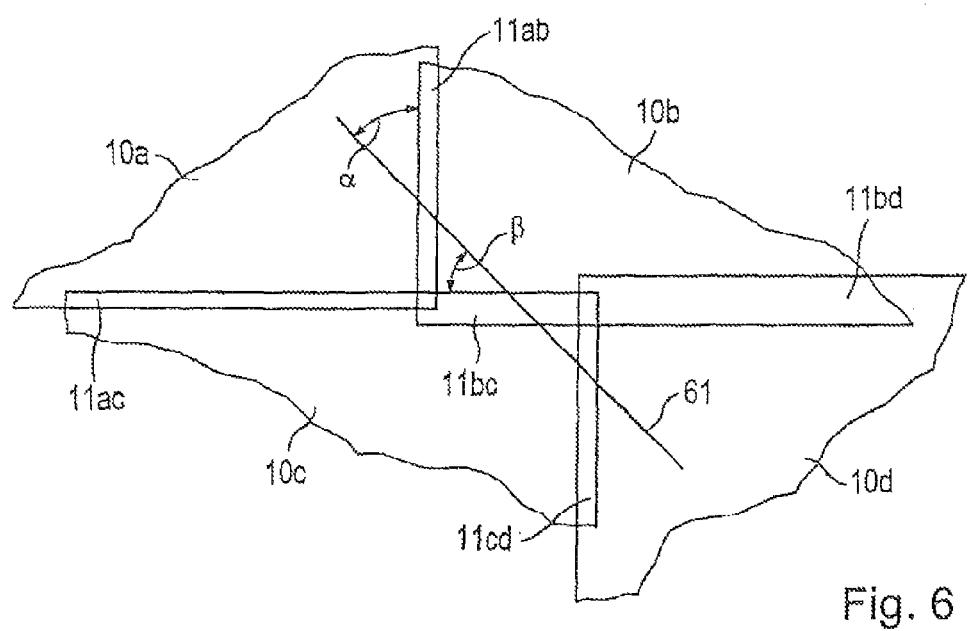

Below, individual embodiments of the invention will be described with reference to the drawings, wherein FIG. 1 shows illustrations as to the prior art, FIG. 2 shows a course of action according to the invention, FIG. 3 schematically shows further courses of action according to the invention, FIG. 4 shows a working method according to the invention, FIG. 5 shows possibilities of distribution in the transition area, FIG. 6 shows a possibility of track guidance, and FIG. 7 shows ratios in a particular embodiment.

FIG. 2 shows how the working windows can be adjusted on a workpiece surface according to the invention. Again the area is shown in which four working windows $10a$, $10b$, $10c$ and $10d$ adjoin one another. The respective limits of the working windows are also drawn, reference being again made to the fact that these limits are not recognizable in reality but exist for the reason of prevailing conditions of the system. The windows are adjusted such that they overlap. Thus, overlapping areas 11 are generated. The overlapping area $11ab$, for example, lies in the working window $10a$ as well as in the working window $10b$. The overlapping area $11bd$ lies in the working window $10b$ as well as in the working window $10d$. Positions on the workpiece surface in one overlapping area can optionally be machined from the one or the other working window. FIG. 2 shows that it is precisely because of the overlap that the limits of the working windows no longer lie upon one another. Rather, the limit of the one working window lies within the adjacent working window. Working windows can be rectangular or square.

The size of the overlap can be adjusted. The overlap degree ue can be defined as $$ue = due/dA$$

wherein—viewed in one dimension of the workpiece surface—due is the dimension of the overlap and dA is the dimension of the working window as a whole. The overlap is generated by a relative displacement along a distance v which is smaller than the dimension dA of the working window. The following applies:

$$dA = v + due$$

In other words, the displacement distance v of beam guiding device and workpiece relative to one another can be a fraction or proportional factor n of the dimension of the working window dA in the direction of displacement. n can be 0.9 or smaller or 0.55 or smaller or 0.35 or smaller.

As regards the considered working window and the dimension dA thereof, in so far a window "voluntarily" restricted to a degree may also be meant which can be selected smaller than the technically possible degree. For example, it may be desired to keep the impingement angle of the laser beam on the workpiece surface within a certain area or to avoid edge effects in the beam control. The angle restriction can be achieved by deflecting the beam starting from the center (perpendicular direction of impingement) to the left, right, top and bottom by a small amount only so that a correspondingly smaller working window having a smaller dA in contrast to the technically possible one is generated. The dimension dA as upper limit can be 90%, 80%, 70% or 60% of the technically possible dimension. Such voluntarily limited working window can be adjusted by allocating only such machining spots to the technically possible working window that the desired restriction results. The desired overlaps are then adjusted, taking into consideration the window dimension dA generated by the voluntary restriction.

Figure 3A:
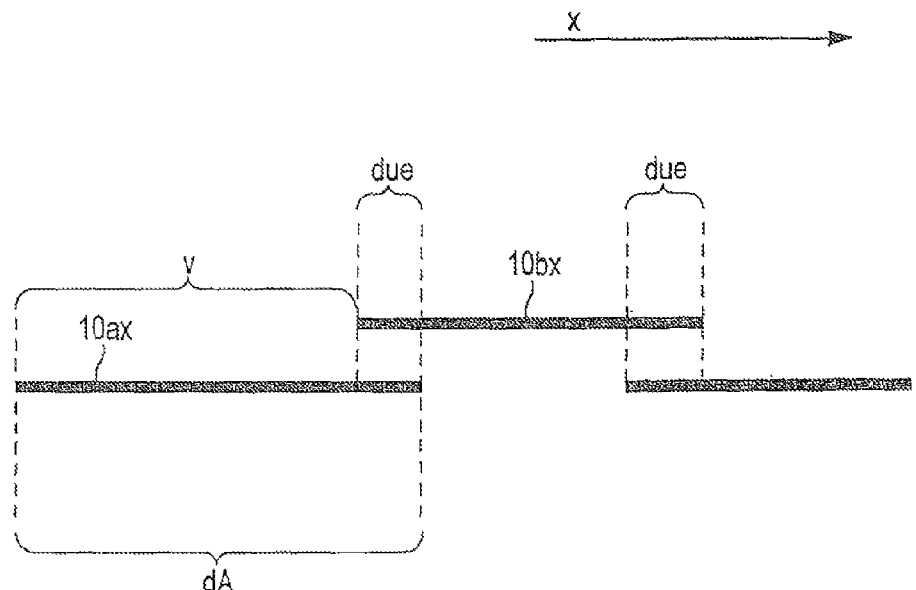

FIG. 3a schematically shows the considered magnitudes. The bold black lines therein schematically symbolize the extension of the working window into one of the surface dimensions, for example the x-direction. The superimposed lines are not supposed to outline a particular arrangement of the windows in the z-direction (for the windows exist only virtually) but are only supposed to schematically show in how far the respective working windows overlap one another. The bar 10ax symbolizes the dimension of the working window 10a in the x-direction, the bar 10bx the dimension of the working window 10b. Usually these values are equal because as a rule they depend on constructional properties of the laser, the optical system and the beam guiding device which are not changed by a relative displacement of the beam guiding device 4 and the workpiece 5 relative to one another for changing the working window.

In order to determine the overlapping degree ue, the determining magnitudes are measured preferably in a direction parallel to a boundary of the working window. The overlap ue can be greater than 1%, greater than 5%, greater than 10%. It can also be 50% (FIG. 3b) or greater. As a result, each spot on the workpiece can be machined from at least two working windows. It can also be 66.6% (FIG. 3c) or greater. As a result, each spot on the workpiece can be machined from at least three working windows. The overlapping degrees ue can be different in different directions (x, y) of the surface of the workpiece. Overlaps on the left and right-hand side can be equal or different, the same applies to overlaps in the front and rear. The overlaps on the left and right or front and rear can be symmetrical and adjusted in both dimensions of the workpiece surface.

FIG. 4a shows a course of action inside the overlapping area 11 and outside thereof. Outside the overlapping areas machining spots or machining lines on the workpiece surface can be approached exclusively from a single machining position. For the working window 10a, these are the positions 41a in FIG. 4a which are manufactured from the relative position 40a. In an analogous turn, the positions 41b in the window 10b are manufactured from the relative position 40b. Alternatives thereto are not possible in the respective cases because the positions 41a and 41b lie outside the overlapping area or protrude therefrom. In contrast thereto, the working positions 41u lie in the overlapping area and can optionally be manufactured from the one or the other relative position. FIG. 4a shows the positions 41ua as manufactured from the relative position 40a while the position 41ub is shown as manufactured from the relative position 40b.

In this manner no clearly visible "joint" is generated between the two working windows. Rather, the transition area has a wider surface and the—unavoidable—"continuity flaw" is more distributed and thus less concentrated and therefore less visible. In contrast to the details as shown, it is also possible to machine point-by-point instead of line segments, a decision being made for each spot inside the overlapping area whether it is to be manufactured from the one or the other of the possible relative positions. The machining decisions made for the first machined working window as to working positions can be stored in order to determine or avoid working positions in accordance thereto in the working window to be machined later.

In FIG. 4a, the x-direction from the left to the right is assumed to be the direction of displacement of the working window. The machining spot 51ub, which is manufactured from the second later relative position, lies behind the machining spot 41ua which is manufactured from the first relative position 40a. FIG. 4a shows line-like individual machining operations. However, they can also be area-like spots ("islands") each of which can be manufactured by a single laser pulse or by traveling the surface.

FIG. 4b shows a different transition strategy. Here, continuous lines are manufactured. Their joints (continuities) too can have irregularities. However, the transition is distributed in the x-direction. The joint is not always located at the same x-position, but at various sites in the direction of displacement (x-direction in FIG. 4b). There are also machining sites 42b on the workpiece with this kind of continuity which are machined from the second relative working position 40b and positioned in the direction of displacement (x-direction) behind a machined site 42a machined from the first relative working position.

Both in the embodiment of FIG. 4a and in the embodiment of FIG. 4b either the selection of the relative working position for machining a site (FIG. 4a) or the selection of the transition point for the guidance of a line from the relative working position 40a towards the relative working position 40b can be selected according to certain criteria. The criterion can, for example, be a fixed pattern which, however, can e.g. be distributed over a relatively wide area and can appear quasi-randomly. The criterion can also actually be a statistical function. FIG. 5 shows corresponding examples.

A probability Pa is shown across the x-coordinate with which a particular spot is machined from the working window 10a. In that area of the working window, which does not lie inside a transition area, the probability for a machining from the covering working window is 1 because only the covering working window is a possibility and all other working windows do not reach thereat. In contrast thereto, the probability can change in the transition area 11ab. For example, it can constantly be 0.5, as shown by curve 51a. This means that it is equally probable for each working location in the overlapping area to be machined either from the working window 10a or from the working window 10b.

However, courses are also conceivable which depend on the position in the working window or in the overlapping area. Curve 51b shows a probability linearly falling from 1 to 0 in the transition area, curve 51*c* shows an s-shaped probability curve. As far as only two working windows overlap, the probabilities of the machining of a spot to be machined from the two windows add up to 1. Accordingly, the course shown in FIG. 5*a* is the course of 1 minus the probability to be machined from the working window 10*b*. This is schematically outlined on the right-hand side of the graph by the downward directed coordinate.

The workpiece can also be machined at many non-coherent sites the respective dimensions s (greatest or equivalent diameter) of which is smaller than the extension due of the overlapping area. There, it is possible to select whether the machining is performed from the one or the other possible working window. The selection can be made statistically or quasi-statistically. The dimensioning rule between s and due can be $$due > n*s$$

wherein n can be 4 or 7 or 10. In this dimensioning rule, it is also possible to use the distance ds between non-coherent sites instead of s, wherein in the case of unequal distances ds may be a smallest distance.

If all areas on the surface of the workpiece are overlapping areas, the machining probabilities from one window can be continuous and preferably symmetrical curves. For example, they can be bell curves focused on the center of the respective working window.

In this connection it is pointed out that the statistical or quasi-statistical machining decision can be made for the first machined window but that these decisions can be stored in order to be able to then systematically work through the "flaws" from the other window.

In a joining technique according to FIG. 4*b* the position in the overlapping area in the x-direction, where a continuous line ends (the "joint") can have a constant probability density in the transition area. However, in this case it is also possible to select courses similar to those according to 51*b* or 51*c*.

Figure 3B:
Figure 3C:
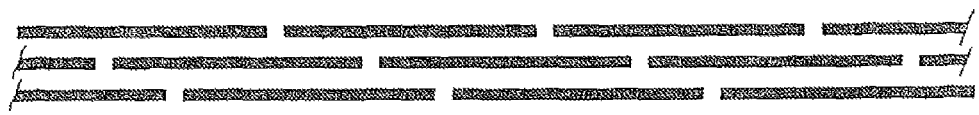

The situation becomes more complex if sites on the workpiece can be machined from three or more working windows, for example in embodiments as schematically outlined in FIG. 3*c*. Then, it will be possible to select probability curves, e.g. bell curves or the like, for the respective remaining machining sites. These machining decisions can also be stored in order to systematically close the previous "flaws" according to the stored data at least from the last working window.

FIG. 6 shows a plurality of further embodiments in combination. Line 61 shows a continuous line introduced by the beam guiding device. One recognizes that it encloses an angle α or β with each working window limit, which angle is unequal to zero or 90 degrees. In other words, the lines along which the laser beam is guided, do not move in parallel to a working window limit but can maintain minimum angles or angle ranges predetermined therefor. Thus, it is ensured that each line guide cuts a working window limit at an acceptable angle so that no grinding cuts occur in the transition areas which in connection with positioning inaccuracies upon the setting of the working window may lead to distinctive undesired superimpositions. In particular, it is thus avoided that parallel lines are pushed upon one another. This would be clearly recognizable in some dimensionings even if whole lines were exchanged for one another, which is possible, for example, in the guidance according to FIG. 4*b*, if here the transition is not only to be ensured between working window adjoining one another left and right but also between working window adjoining one another above and below.

If the surface of a workpiece is machined along imaginary lines, these may enclose an angle between 30° and 60° with the working window limits, the angle preferably being 45° so that symmetrical proportions result in the direction of both limits. However, if in contrast thereto generally determined angle settings are to be observed, for example such that the angle between the track and the machining window is to be greater than 60°, it is also possible to introduce curved beam guiding paths.

Furthermore, FIG. 6 shows that the overlapping areas of adjoining working windows do not have to be aligned in both dimensions (x, y). On the contrary, they can be offset against one another in one of the dimensions.

The displacement of the beam guiding device and the workpiece relative to one another can be made when the laser machining has been stopped or can also be made during laser machining.

If a cavity is to be manufactured by an area-wide removal of a plurality of or many layers, the approach can be such that the above-described method of providing overlapping areas only in those layers which are in the vicinity or proximate to the outer surface is used. Such layers can have variable z-dimensions which can be introduced in the laser preferably via the focusing optics.

A particular aspect of the invention is a method for machining wherein only point-by-point or "insular" machining applications are provided, that means such applications wherein material does not have to be removed in a voluminous amount by removing many layers in sequence but wherein merely shallow surface machining operations or only in a point-by-point manner or in non-coherent areas are to be performed by a small number of cycles (preferably in only one per surface area). "Islands" or "points" in this context may be isolated machining areas, the largest dimension of which has an upper limit of 200 μm, 100 μm, 50 μm or 20 μm or which are manufactured by a limited number ($\leq$10 or 5 or 2 or 1) of pulses of a pulsating laser beam. Successive pulses can hit the same x-y position in order to manufacture points of greater depth.

In this manner, it is possible to manufacture, for example, scatter plates or molds therefor for laminar background illuminations of laptops, which are larger than the working window. They have scatter centers for light distributed across the surface which scatter light out thereof that was laterally irradiated into the plate. These scatter centers and molds therefor, respectively, can be generated by point-by-point or insular laser beam impact. The points or islands can be non-coherent and arranged statistically or quasi-statistically or regularly in the x-y plane. However, the individual points or islands can also be arranged along imaginary lines, which means that then their position on the respective (imaginary) line can be determined in a statistical or quasi-statistical or regular manner. The number of islands or points can be comparatively high, for example more than 1 million or even more than 10 million for one workpiece.

Generally said, the selection of machining (that is, the selection of the machining window from which individual points or islands are manufactured) can be made as described above.

Figure 7A:
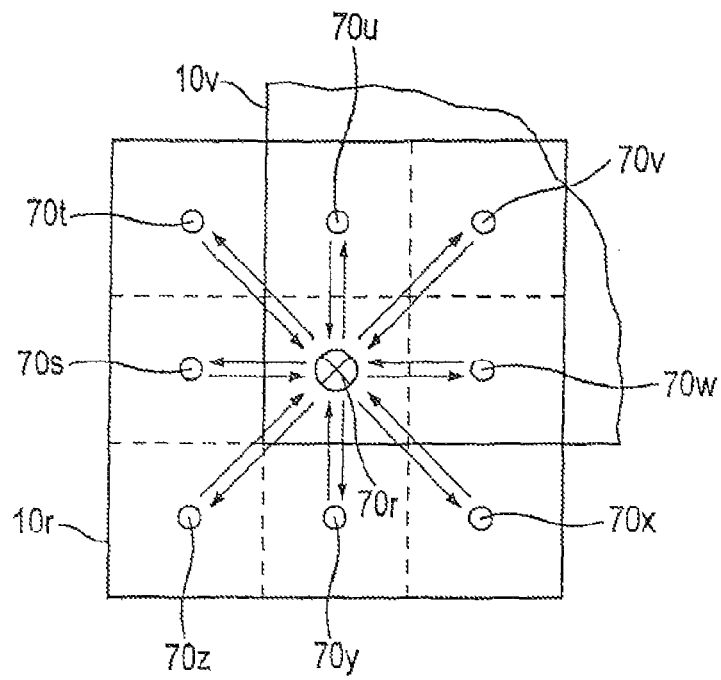

In particular, an overlap degree ue of 50% or 66.6% can be selected according to a double or three-fold covering of the workpiece surface (FIGS. 3*b*, 3*c*). FIG. 7*a* shows the ratios for ue=66.6%. 70*r* outlines a relative position to which the working window 10*r* belongs. 70*s*-70*z* outline further relative positions each having their own working windows. Merely the working window 10*v* associated with the relative position 70*v* is still touched on. For the sake of clarity, the boundaries for the other positions have been omitted. Thus, each position on the surface of the workpiece can be reached from 9 different relative positions. For the square inside the window 10r these are the relative positions 70r-z as shown.

Generally, the control is performed such that the machining operations of the individual points or islands are so interlaced that crossings with all possible neighbors, even along diagonal directions, are made. It is possible to machine one or more sites, points or islands on the workpiece from a second relative working position displaced as compared to a first relative working position, which, when viewed in the direction of displacement, are located behind a site, point or island machined from the first relative working position.

This may apply for directions of displacement along both planar dimensions (x-axis, y-axis) and also for displacements along diagonal directions.

Figure 7B:
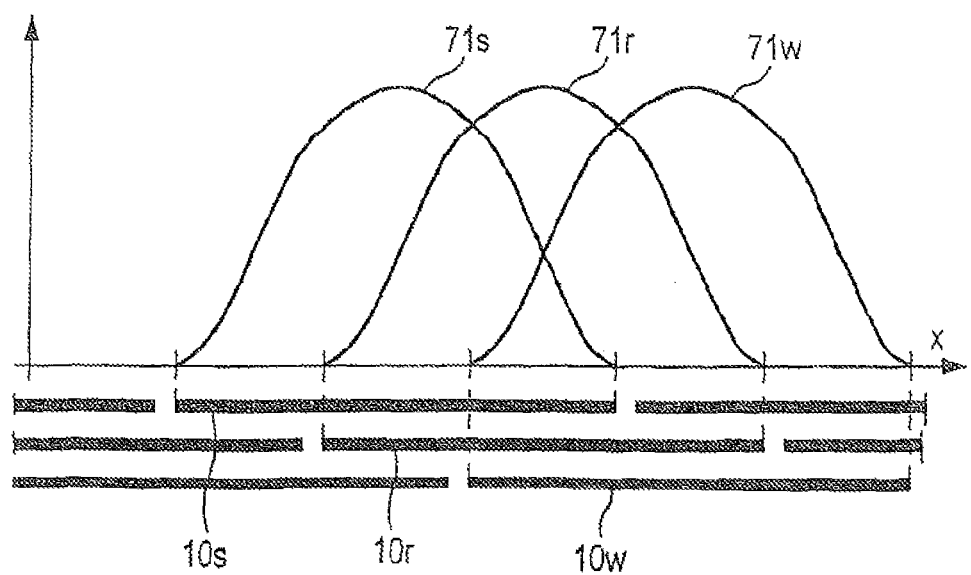

FIG. 7b shows possible distribution probability densities along the x-axis for machining a particular position from a particular relative position. The curves 71s, 71r and 71w correspond to the working windows 10s, 10r, 10w of the relative positions 70s, 70r and 70w. They can be mobile, for example, bell-shaped, as shown, or corresponding to an inverted "V". In a quantitatively or qualitatively equal manner they can result along the y-axis or also along diagonal directions. In contrast to the illustration shown in FIG. 7b, constant probability densities can be used instead of mobile probability densities.

Again, it is pointed out that the statistical or quasi-statistical allocation of a point or island machining operation to a particular working window can be selectable only in the first worked-through working window (for example, 10r in FIG. 7a) and then can be stored. A later worked-through window (e.g. 10v) may have to consider the already existing machining operations in a suitable manner, for example such that a suitably modified statistical setting is exclusively applied to the remaining free surfaces. Considered from the point of view of the result, however, the ratios according to the curves 71s, r, w may appear.

The allocation of machining sites, in particular points or islands, to one of a plurality of possible working windows can be made completely or in part before work is begun or completely or in part during work.

Accordingly, a method for structuring a surface or for machining a scatter plate or a scatter plate mold is a subject-matter of the invention. The workpiece is the blank of the scatter plate or of a mold therefor. It is larger than the working window of the laser machining device. The scatter centers or molds therefor are many non-coherent recesses in the surface which are generated by a point-by-point or insular laser impact. The individual scatter centers can be distributed in a particular manner as described. In the overlapping area of two working windows their manufacture can decided and then performed from the one or from the other window, as described. The overlapping degree can be 66.6% along a respective one or along both planar dimensions according to a three-fold complete covering of the surface of the workpiece.

The invention claimed is:

1. A method for machining a workpiece by means of a laser beam, wherein a laser beam is guided by a beam guiding device over the surface of the workpiece within a working window for ablation of material in one or more layers from the instantaneous workpiece surface, the beam guiding device and the workpiece being arranged in such a way that they are movable relative to one another in a direction of displacement for a displacement distance and that they can take in a first and a second relative working position to one another, characterized in that within one layer, a spot on the workpiece can be machined from the second relative working position, said spot being located behind the spot which is machined from the first relative working position when viewed in the direction of displacement, and characterized in that a decision is made for a spot in the overlapping area of the working windows in accordance with a probability function from which relative position the spot will be machined or at which spot the machining from a relative position will stop in order to be continued from another relative position.

2. The method for machining a workpiece, in particular according to claim 1, by means of a laser beam, wherein a laser beam is guided by a beam guiding device over the surface of the workpiece, the laser beam being guidable inside a working window for ablation of material in one or more layers from the instantaneous workpiece surface, and the beam guiding device and the workpiece being arranged in such a way that they are movable relative to one another in a direction of displacement for a displacement distance and that they can take in a first and a second relative working position to one another, characterized in that during displacement the displacement distance is smaller than the extension of the working window in the direction of displacement.

3. The method according to claim 1, characterized in that the displacement distance v satisfies the following condition:

$$v<n*dA$$

wherein n is a share factor which may be 0.9 or 0.7 or 0.5, and dA is the dimension of the working window in the direction of displacement.

4. The method according to claim 1, characterized in that a constant probability is present in the overlapping area for machining a spot from one of the relative positions or that the probability for machining a spot from one of the relative positions depends on the location of the respective spot within the overlapping area.

5. The method according to claim 1, characterized in that the displacement distances along a direction are selected such that at least a few spots can be machined from three relative working positions.

6. The method according to claim 1, characterized in that it is applied in both dimensions of the surface of the workpiece.

7. The method according to claim 1, characterized in that the laser beam is guided inside a working window in such a way that the path thereof on the surface of the workpiece includes an angle of at least 10°, preferably at least 30°, with each limit of the working window.

8. The method according to claim 2, characterized in that the workpiece is machined at many non-coherent points, the dimensions thereof being smaller than the extension of the overlapping area, wherein the selection of the machining of the machining spots from a working window is conducted statistically or quasi-statistically.

9. The method according to claim 2, characterized in that the overlapping areas of adjoining working windows do not align with one another in both dimensions (x, y).

10. The method according to claim 1, characterized in that the working window is smaller than a technically introducible working window limited in a rectangular or square manner, the size being selectable according to edge effects or impingement angles of the laser beam.

11. The method according to claim 9, characterized in that the workpiece is machined at many non-coherent spots, the number thereof can be larger than 1,000,000, preferably larger than 10,000,000, and the respective largest dimension of which may be smaller than 100 µm, preferably smaller than 50 µm, in the surface of the workpiece or which can be manufactured by individual laser pulses.

12. The method according to claim 1, characterized in that a spot on the workpiece is machined inside a track from the second relative working position, which, when viewed in the direction of replacement, lies behind a spot on the same track machined from a first relative working position.

13. A device for performing the method according to claim 1.

14. The method according to claim 1, wherein within said one layer said spot on the workpiece is machined from only the second relative working position and said spot located behind said spot is machined from only the first relative working position.

15. A method for machining a workpiece by means of a laser beam, wherein a laser beam is guided by a beam guiding device over the surface of the workpiece within a working window, the beam guiding device and the workpiece being arranged in such a way that they are movable relative to one another in a direction of displacement for a displacement distance and that they can occupy a first and a second relative working position to one another, characterized in that a spot on the workpiece can be machined from the second relative working position, said spot being located behind the spot which is machined from the first relative working position when viewed in the direction of displacement, and characterized in that a decision is made for a spot in the overlapping area of the working windows in accordance with a probability function from which relative position the spot will be machined or at which spot the machining from a relative position will stop in order to be continued from another relative position.

16. The method according to claim 15, characterized in that a constant probability is present in the overlapping area for machining a spot from one of the relative positions or that the probability for machining a spot from one of the relative positions depends on the location of the respective spot within the overlapping area.

* * * * *

UNITED STATES PATENT AND TRADEMARK OFFICE
CERTIFICATE OF CORRECTION

PATENT NO. : 8,525,076 B2  
APPLICATION NO. : 12/531587  
DATED : September 3, 2013  
INVENTOR(S) : Peter Hildebrand Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 823 days.

Signed and Sealed this  
Twelfth Day of May, 2015

Michelle K. Lee  
*Director of the United States Patent and Trademark Office*